(12) United States Patent
Difranco

(10) Patent No.: US 11,595,141 B2
(45) Date of Patent: Feb. 28, 2023

(54) UNIFIED COMMUNICATIONS LINK STATUS ANALYZER APPARATUS FOR AGILE CONTROL IN CONTESTED ENVIRONMENTS

(71) Applicant: Rockwell Collins, Inc., Cedar Rapids, IA (US)

(72) Inventor: Ian P. Difranco, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/220,558

(22) Filed: Apr. 1, 2021

(65) Prior Publication Data

US 2021/0328693 A1 Oct. 21, 2021

Related U.S. Application Data

(60) Provisional application No. 63/011,893, filed on Apr. 17, 2020.

(51) Int. Cl.
*H04B 17/373* (2015.01)
*H04B 17/318* (2015.01)

(52) U.S. Cl.
CPC ......... *H04B 17/373* (2015.01); *H04B 17/318* (2015.01)

(58) Field of Classification Search
None
See application file for complete search history.

(56) References Cited

U.S. PATENT DOCUMENTS

| | | | |
|---|---|---|---|
| 7,245,216 B2 | 7/2007 | Burkley et al. | |
| 7,643,428 B1* | 1/2010 | Dwekat | H04L 41/147 370/241 |
| RE44,606 E | 11/2013 | Herz et al. | |
| 8,904,522 B1 | 12/2014 | Kambhampati et al. | |
| 9,322,907 B1* | 4/2016 | Kadambe | G06N 20/00 |
| 9,860,129 B2 | 1/2018 | Zinger et al. | |
| 9,887,768 B1* | 2/2018 | Thommana | H04B 7/2696 |
| 9,967,206 B1* | 5/2018 | Thommana | H04B 1/7143 |
| 10,206,143 B2* | 2/2019 | Altman | H04W 24/10 |
| 10,708,887 B1* | 7/2020 | Evans | H04W 4/40 |
| 2003/0198304 A1* | 10/2003 | Sugar | G01R 13/0254 375/340 |
| 2004/0023674 A1* | 2/2004 | Miller | H04L 27/0012 455/445 |
| 2004/0203826 A1* | 10/2004 | Sugar | H04B 17/309 455/450 |
| 2004/0259555 A1* | 12/2004 | Rappaport | H04W 16/18 455/446 |

(Continued)

*Primary Examiner* — Gennadiy Tsvey
(74) *Attorney, Agent, or Firm* — Suiter Swantz pc llo

(57) ABSTRACT

A system and method for communications link status analysis is disclosed. In embodiments, the system includes a radio systems interface (RSI) for listening to communications assets of a ground-based or mobile host platform. Radio data on communications traffic and their originating platforms is stored and analyzed to determine the link status of current communications links to other platforms. A link record is updated with the current links and associated platform information. A propagation analyzer forecasts future link statuses for identified current links based on the available platform data and forwards the propagation forecasts to operators of the host platform.

10 Claims, 6 Drawing Sheets

(56) References Cited

U.S. PATENT DOCUMENTS

| | | | | |
|---|---|---|---|---|
| 2005/0003828 A1* | 1/2005 | Sugar | H04W 24/00 | |
| | | | 455/422.1 | |
| 2005/0227625 A1* | 10/2005 | Diener | H04B 17/23 | |
| | | | 455/67.11 | |
| 2006/0291580 A1* | 12/2006 | Horvitz | H04L 69/24 | |
| | | | 375/265 | |
| 2010/0075704 A1* | 3/2010 | McHenry | H04W 16/14 | |
| | | | 455/67.11 | |
| 2010/0305931 A1* | 12/2010 | Fordham | H04W 16/18 | |
| | | | 703/13 | |
| 2011/0090939 A1* | 4/2011 | Diener | H04L 1/0001 | |
| | | | 375/136 | |
| 2011/0243214 A1* | 10/2011 | Wolcott | H04L 25/03343 | |
| | | | 375/232 | |
| 2014/0065975 A1* | 3/2014 | Schmidt | H04B 17/318 | |
| | | | 455/67.11 | |
| 2016/0072840 A1* | 3/2016 | Iyer | H04L 63/20 | |
| | | | 726/1 | |
| 2016/0127392 A1* | 5/2016 | Baxley | G06F 16/285 | |
| | | | 726/23 | |
| 2018/0309504 A1 | 10/2018 | Mazzarella et al. | | |
| 2018/0332563 A1* | 11/2018 | Sihlbom | H04W 48/10 | |
| 2019/0200244 A1* | 6/2019 | Polepalli | H04W 36/06 | |

* cited by examiner

UNIFIED COMMUNICATIONS LINK STATUS ANALYZER APPARATUS FOR AGILE CONTROL IN CONTESTED ENVIRONMENTS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/011,893 entitled UNIFIED COMMUNICATIONS LINK STATUS ANALYZER FOR AGILE CONTROL IN CONTESTED ENVIRONMENTS, filed Apr. 17, 2020;

Said U.S. Provisional Patent Application 63/011,893 is herein incorporated by reference in its entirety.

TECHNICAL FIELD

The present disclosure relates generally to the field of electronic communication networks. More specifically, the disclosure relates to systems and methods utilized to provide dynamic communication link status, analysis, forecasting, and control.

BACKGROUND

Nuclear events, natural disasters, or other manmade catastrophic events may result in widespread disruption of radio frequency (RF) communications infrastructure. In such contested environments (e.g., Nuclear Command, Control, and Communications (NC3) environments or cyber contested environments), assessment of communications systems, their components, and their performance is essential to establishing and maintaining enduring, survivable, and path-diverse airborne communications networks.

SUMMARY

In a first aspect, a communications link status analyzer (CLSA) apparatus is disclosed. In embodiments, the CLSA includes a radio systems interface (RSI) in communication with all radio and communications assets of an aircraft, vehicle, or other host platform. The RSI includes spectrum sensors for "listening" to each radio and communications asset or associated port, collecting radio data specific to the traffic received or transmitted by each asset. The CLSA includes a data manager for storing the collected radio data in various databases of the host platform for prompt or later analysis. The CLSA includes host processors configured to maintain a link record, link analyzer, propagation analyzer and operator interface. The link analyzer identifies communications links connecting an onboard radio asset to a remote platform as well as associated platform data about the link itself or about the remote platform, updating the link record with the identified links and platform data. The propagation analyzer forecasts future states of the identified current links based on the available platform data. The operator interface forwards the propagation forecasts to a pilot or operator of the host platform.

In some embodiments, either or both of the host platform and the remote platform is an air, sea, or land vehicle or other mobile platform.

In some embodiments, the radio data includes one or more of a signal strength, a frequency, and a transmission mode.

In some embodiments, the radio data includes timing data for a current link and/or the remote platform.

In some embodiments, the propagation forecast indicates the current link as obsolete, and the link analyzer removes the now-obsolete link from the link record.

In some embodiments, the propagation forecast includes best path information for a current link and/or remote platform.

In some embodiments, the propagation forecast includes a command signal for a current link, and/or an event plan responsive to the command signal (such that the event plan initiates an event mode at the host platform).

In some embodiments, the communications assets transmit periodic beacon signals and receive beacons from the remote platforms.

In some embodiments, the link analyzer updates outbound link data by verifying current links according to received beacon signals, radio data associated with the received beacon signals, and inbound updated link data transmitted by other host platforms. The communications assets at the host platform forward the updated outbound link data to the other host platforms.

In a further aspect, a method for communications link status analysis is also disclosed. In embodiments, the method includes collecting, via spectrum sensors onboard a host platform, radio data associated with inbound and outbound communications traffic by listening to all radio/communications assets and ports of the host platform. The method includes identifying current links connecting radio/communications assets or ports to remote platforms with which communications traffic is exchanged. The method includes updating a link record of the host platform with any identified links and additional platform data about the links or their respective remote platforms. The method includes forecasting future propagation states of the identified links based on the associated platform data. The method includes forwarding the propagation forecasts to the pilot or operator of the host platform.

In some embodiments, the method includes generating best path data for the current link and its associated remote platform.

In some embodiments, the method includes receiving beacon signals associated with an event mode from the remote platform. The method includes identifying radio data associated with the received beacon signals. The method includes updating outbound link data by verifying current links in the link record based on received beacon signals and associated radio data. The method includes forwarding the updated outbound link data to other host platforms.

In some embodiments, the method included receiving updated inbound link data from the other host platforms.

In some embodiments, the method includes updating the outbound link data by verifying all current links in the link record based on the updated inbound link data.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
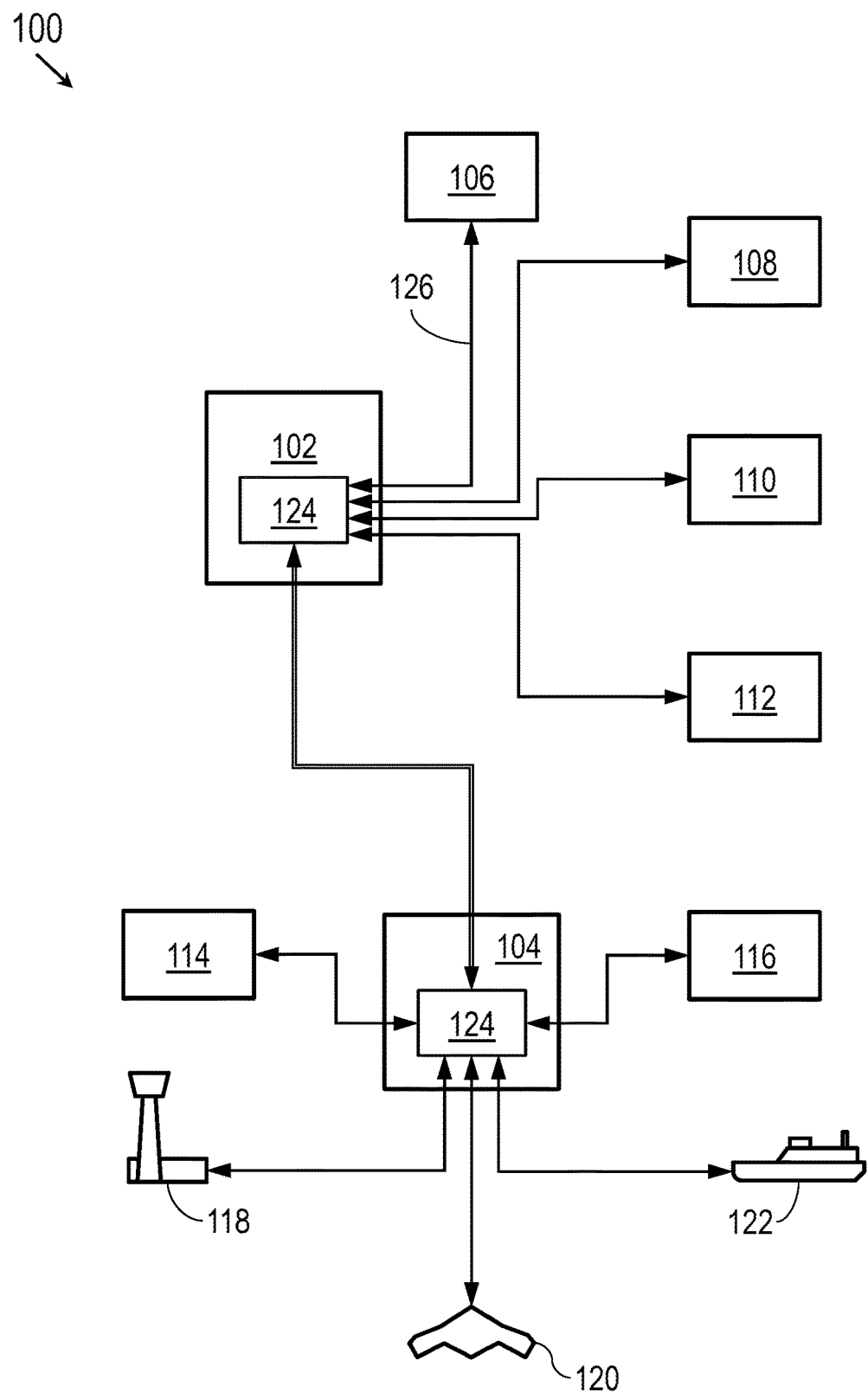
FIG. 1 is a block diagram illustrating a communications network in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are disclosed to a communications analysis apparatus configured to run a secure and reliable communications analysis and forecasting system ("Echo") capable of providing the real-time status of communications links in a nuclear command, control, and communications (NC3) environment or other contested environment. The Echo system mobilizes existing aircraft, ground, and sea-based locations, each having multiple radio and communications assets, as a large communications network: large in the sense that all radio and communications assets on or aboard a given platform are brought together to become a unified system providing up to date information on available communications links. A network of such platforms may be capable of sharing data dynamically among each individual platform running Echo. Depending on a particular platform and its configuration, Echo can act as a data relay if the platform may be isolated from other platforms or sites. Echo uses the existing communications assets (ground, sea, or air) as a resource to meet its mission and reduce costs (e.g., without the need for additional communications assets). Two critical elements of Echo are the analysis process and the propagation process. The analysis process reviews collected radio data to determine the link state and link quality of all radio assets in use within a given Echo-enabled platform or node. The data created or modified by the analysis process is then used by the propagation process so Echo can forecast the future state of usable links should it become necessary, e.g., in an event mode or other contested environment, to maintain communications on any available links.

Referring to FIG. 1, a communications network 100 is disclosed. The communications network may include host platforms 102, 104 and remote platforms 106, 108, 110, 112, 114, 116, 118, and 122.

In embodiments, the host platforms 102, 104 and the remote platforms 106-120 may establish long-term bidirectional communications networks among themselves. For example, the host platforms 102, 104 as well as the remote platforms 106-120 may include fixed or mobile platforms, e.g., ground-based control facilities 118 and other ground-based platforms; aircraft 120; and ships 122 or other waterborne vehicles. The host platforms 102, 104 and the remote platforms 106-122 may each incorporate multiple radio, data, and communications assets (e.g., voice/data communications in the UHF, HF, VLF, LF, and VHF frequency bands; High Frequency Data Link (HFDL) and other satellite-assisted communications; Wideband Networking Waveform (WNW); Wideband High Frequency (WBHF); Link-16, Single Channel Ground and Airborne Radio System (SINCGARS) and other military communications systems; MIL-STD-1553, Ethernet, RS-232, RS-422, and other data buses and ports).

In embodiments, rather than introduce new hardware or software components, the communications network 100 and its components may utilize existing radio assets to monitor the state of network components and the links between them. In the event of a nuclear incident or some other catastrophic event resulting in a significant or widespread disruption of communications networks, the communications network 100 may quickly assess the operating status of its component nodes and links in contested environments.

In embodiments, the host platforms 102, 104 may each incorporate radio systems interfaces 124 (RSI) capable of continuous full spectrum sensing of any communications traffic received via the radio assets of the host platforms. For example, by passively listening to and analyzing the waveforms of the signals received via its various radio assets, the RSI 124 of the host platform 102 may determine information about the received signals and/or the remote platforms 106, 108, 110, 112 from which the received signals originate, and with which the host platform 102 may or may not maintain active communications links 126.

In embodiments, signals sensed by the RSI 124 may be compared to exemplary waveforms stored by the host platform 102 to draw conclusions about the received signals and their originating platforms based on similarities to known exemplars. For example, for a given sensed signal, the RSI 124 may determine a variety of signal classification factors (e.g., radio data) including, but not limited to: signal frequency; signal strength; signal transmission mode; domain name system (DNS) or Internet protocol (IP) information (e.g., for data transmissions); connected-node or routing-table information; a location of the sender; or an identity of the transmitter. Sensed waveforms and any associated radio data may be stored for further analysis or for use in the analysis of subsequently sensed waveforms.

Figure 2:
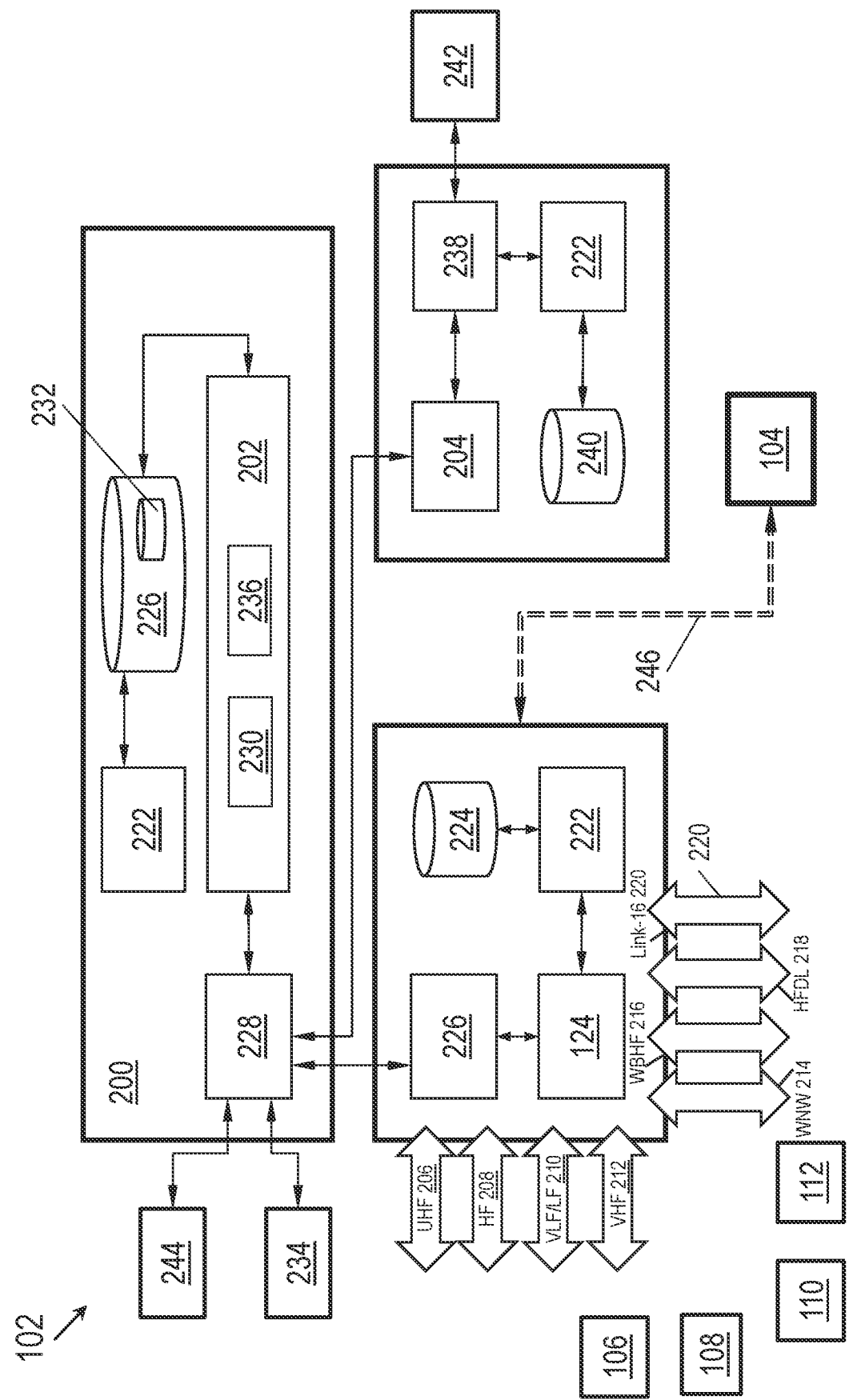
FIG. 2 is a block diagram illustrating a host platform of the communications network of FIG. 1.

Referring to FIG. 2, the host platform 102 is shown.

The host platform 102 may include a communications link status analyzer 200 (CLSA) incorporating, in addition to the RSI 124, host processors 202 and operator interfaces 204.

In embodiments, rather than introducing new communications assets, the CLSA 200 mobilizes existing radio and communications assets aboard the host platforms (102, 104; FIG. 1) to provide real-time information as to the usability of communications links throughout the communications network (100, FIG. 1). Similarly, the CLSA 200 may forecast communication usability for use subsequent to nuclear events or in other contested environments. Host platforms 102, 104 incorporating a CLSA 200 may share and relay critical communications circuit usability information among each other and provide automated control of communications circuits in contested or hostile environments.

In embodiments, the RSI 124 may incorporate spectrum sensors capable of providing full spectrum scanning of all radio and communications assets 206-220 to collect radio data related to communications traffic received by said communications assets. For example, the communications infrastructure for a given host platform 102 (e.g., an aircraft, waterborne vehicle, or ground-based facility) may incorporate hardware and software-defined radio (SDR) resources capable of transmission and reception via a broad variety of communications protocols, including (but not limited to): voice/data communications in the UHF band (206); HF band (208); VLF/LF bands (210) and VHF bands (212); Wideband Networking Waveform 214 (WNW); Wideband High Frequency 216 (WBHF); High Frequency Data Link 218 (HFDL) and other satellite-assisted communications; Link-16 (220), Single Channel Ground and Airborne Radio System (SINCGARS) and other military communications systems; MIL-STD-1553, Ethernet, RS-232, RS-422, and other data buses and ports.

In embodiments, the RSI 124 may operate passively in the background, listening to radios and ports when they are not otherwise active and sharing information (e.g., via the Global Information Grid (GiG)) with operator permission, so as not to interfere with communications traffic or mission objectives. For example, the RSI 124 may monitor inbound and outbound traffic to and from the radios and ports 206-220 as well as any changes to discrete electrical lines to and from the radios and ports.

In embodiments, the CLSA 200 may include a data manager 222 for distributing collected radio data, e.g., within the interface databases 224 of the RSI 124 or within host processor databases 226. For example, the data manager 222 may store collected radio data until needed or for later analysis. Other components of the CLSA 200 may read, add, update, or delete collected radio data solely through the data manager 220.

In embodiments, the data manager 222 may interface (226, 228) with host processor 202 (e.g., control processor) functions of the CLSA 200. For example, the host processors 202 may include link analyzers 230 for determining a link state of each radio/communications asset 206-220 based on unique protocols according to the specific radio/communications asset and the nature of its inbound and outbound communications. Radio data collected by listening to the HF ports 208, for example, may indicate an active link to a known remote platform 106-112 at a particular frequency.

In embodiments, any radio/communications asset 206-220 in a determined link state may be logged by the link analyzers in a link record 232 (e.g., housed in the host processor databases 226 or elsewhere as determined by the data manager 222). The link record 232 may include the current link (e.g., to the remote platform 106-112 via the HF ports 208) as well as any additional information about the current link, about related communications traffic sent or received via the current link, or about the remote platform, that can be determined by classification analysis of the radio data. For example, the link analyzers 230 may be able to determine one or more of: a signal strength of the current link; a transmission duration; details about any ambient noise associated with the related communications traffic; domain name service (DNS) or internet protocol (IP) information associated with the remote platform; connected node or routing table information (e.g., if the remote platform is a relay node); physical antenna elements of the remote platform, and/or identifying or location information of the remote platform. In embodiments, collected radio data may include timing information 234 associated with any sent or received communications traffic via a given current link, or with the remote platform 106-112 on the other end of the current link.

In embodiments, the host processors 202 may include propagation analyzers 236. For example, based on collected radio data stored to the link record 232 the propagation analyzers 236 may generate propagation forecasts as to the future link state of a given current link. For example, propagation forecasts may include an assessment of the future viability of the current link, based on the associated frequency spectrum and any unique aspects or conditions of the link state, e.g., if the remote platform 106-112 is a mobile platform, the likely future velocity and/or position of the remote platform, or any environmental conditions specific to the current link that may affect future link propagation (e.g., whether the remote platform is in a rainy environment or a forested/rough terrain environment). If a current link is determined to be of low present or future viability, the link may be classified as obsolete by the propagation analyzers 236 and removed from the link record 232 (e.g., although pertinent information about the corresponding radio and communications assets 206-220 and/or remote platform 106-112 may remain in data storage).

In some embodiments, propagation forecasts may include best path information and/or routing data associated with the best possible path for a current link to reach its intended remote platform 106-112 (e.g., either currently or at some future point). For example, best path information may include, but is not limited to: a best channel for reaching a particular remote platform 106-112, and/or ideal power levels, transmission modes, antenna elements, or transmission times associated with optimal connectivity to the remote platform via the current link. In some embodiments, propagation forecasts may include event action plans (EAP) based on which current links and/or remote platforms 106-112 are available or reachable during a given hypothetical scenario which may involve a contested or hostile environment.

In embodiments, the CLSA 200 may include an operator interface 204 via which propagation forecasts may be provided to other user applications 238 (e.g., flight control or navigation applications, if the host platform 102 is an aircraft (120, FIG. 1)) or stored in operator databases 240 for future use or analysis. Via the user applications 238, operators 242 of the host platform 102 may, in a pre-event state (e.g., normal mode 300, FIG. 3), determine whether or not to act on the propagation forecasts. For example, human operators may decide whether or not to take additional action based on collected radio data or propagation forecasts, but the CLSA 200 will not otherwise interfere with ongoing communications or operations.

In some embodiments, incoming command signals received by the radio and communications assets 206-220, or notification via nuclear event detection (NED) equipment 244 (e.g., or like event detection equipment aboard the host platform 102) may indicate a nuclear event or some other like incident associated with a contested or hostile environment. Should such an event be detected or declared, the radio/communications assets 206-220 may similarly enter an event mode (400, FIG. 4) whereby all radio/communications assets broadcast periodic beacon signals (according to the best frequencies, modes, channels, determined via pre-event propagation forecasting) and similarly listen for beacon signals originating from other remote platforms 106-112.

In embodiments, the CLSA 200 may respond to an event detection by entering "event mode" 400 and taking automatic action. In embodiments, when in "event mode" 400 the CLSA 200 may automatically verify the link status of any current link identified as viable within the link record 232. For example, based on collected radio data associated with the beacon signals received by the radio and communications assets 206-220, the CLSA 200 may determine which current links in the link record 232 remain viable and update the appropriate link records with any new or current data related to the viable links and their associated remote platforms 106-112. In embodiments, link verification protocols may include automatic circuit setup or optimization of the radio and communications assets 206-220 according to best path information and automatic inclusion of timing information (e.g., to avoid contention in a contested environment with a high propagation of beacon signals). Further, link verification protocols may include notifying the operators 242 of any remote platforms 106-112 not equipped with a CLSA 200 to manually verify all last known current links.

In embodiments, available information about current links verified by the CLSA 200 (including any associated platform data corresponding to relevant remote platforms and best path information, and including any current links manually verified by remote platforms 106-112) may be disseminated by the CLSA 200 to other host platforms 104 incorporating CLSA equipment via dedicated backchannel connections 246 (e.g., backhaul connections). For example, each CLSA 200 may generate encrypted compressed data packages based on updated current link information and platform data and transmit the encrypted data packages to the host platform 104, similarly receiving encrypted data packages based on current link information and platform data verified by the CLSA 200 of the host platform 104. For example, if the host platform 104 is geographically isolated, the CLSA 200 of the host platform 102 may relay received verified current link information on to other host platforms, while passing on to the host platform 104 any verified current link information received from other host platforms not in communication with the host platform 104.

Figure 3:
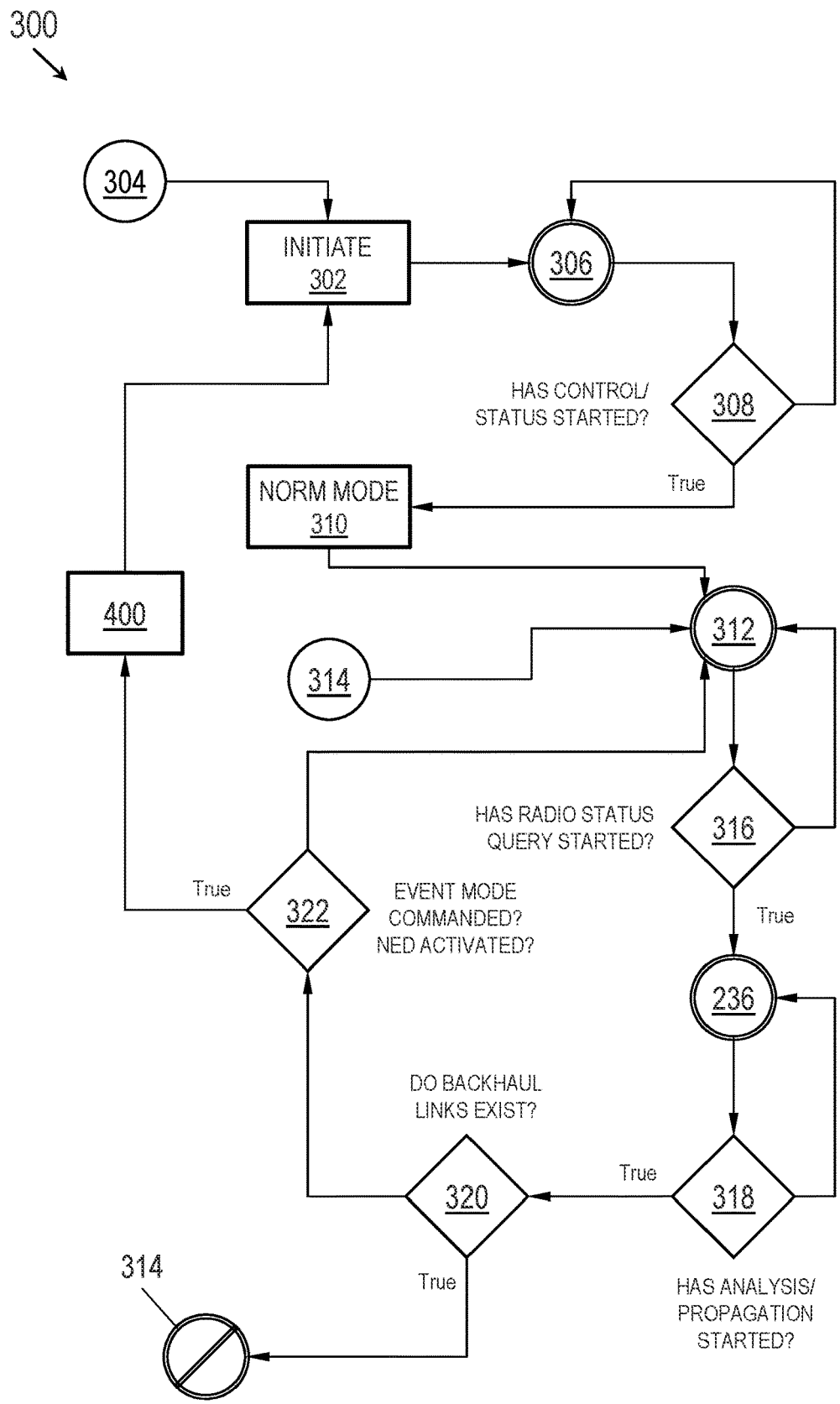
FIG. 3 is a block diagram illustrating normal mode operations of the communications network of FIG. 1.

Referring now to FIG. 3, a normal-mode operational flow 300 of the CLSA (200, FIG. 2) is disclosed.

In embodiments, the CLSA 200 may initiate normal operating mode (302) based on an operator command entry (304) or upon re-entry from event mode 400. Normal operating mode may be initiated via control and status operations (306); if control and status operations have commenced (308), normal operating mode is engaged (310). When normal mode is engaged (310), the CLSA 200 may first query (312) all onboard radio systems (206-220, FIG. 2) for status. For example, normal mode may be entered from a backhaul process (314) at this point. If the radio system status query has commenced (316), the CLSA 200 may begin analysis and propagation processes 236. If analysis and propagation operations have started (318), the CLSA 200 may attempt to determine (320) if backhaul links (e.g., backchannel connections 246, FIG. 2) exist. If backhaul links do exist, the CLSA 200 may exit normal mode to a backhaul process (314). If backhaul links do not exist, the CLSA 200 may attempt to determine (322) whether event mode has been commanded, e.g., via activation of a Nuclear Event Detector (NED). If event mode has been commanded, the CLSA 200 may exit normal mode and initiate event mode 400.

Figure 4:
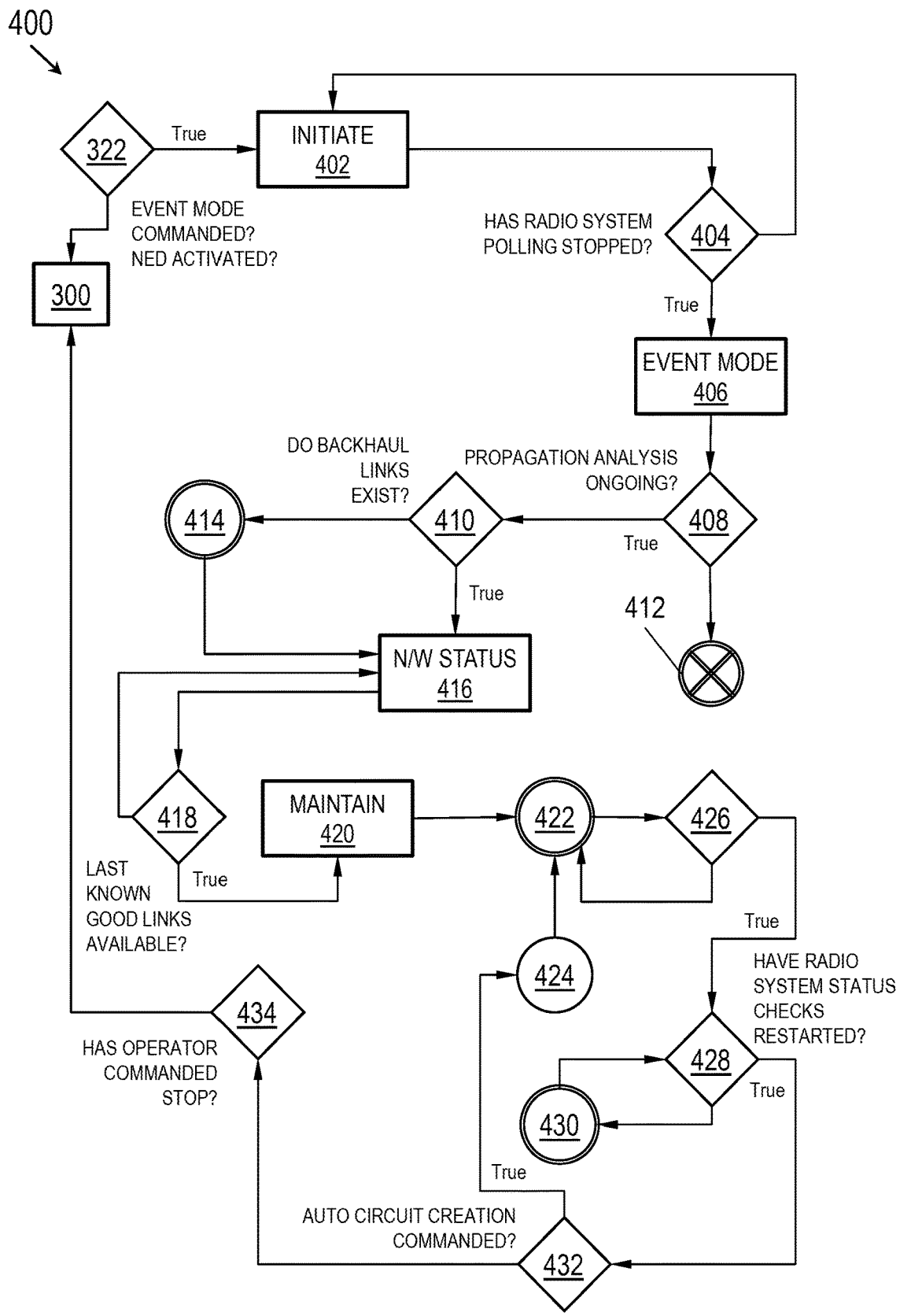
FIG. 4 is a block diagram illustrating event mode operations of the communications network of FIG. 1.

Referring now to FIG. 4, an event-mode operational flow 400 of the CLSA (200, FIG. 2) is disclosed.

In embodiments, if event mode has been commanded (e.g., from a CLSA 200 operating in normal mode 300) or a NED has been activated, the CLSA may initiate event mode (402); if neither of these events have taken place, the CLSA may resume normal operating mode. If the CLSA 200 determines (404) that polling of the radio systems (206-220, FIG. 2) has stopped, event mode may commence (406). If the CLSA 200 determines (408) that propagation and analysis operations (236, FIG. 2) are still running, the CLSA may attempt to determine whether backhaul links exist (410); if propagation analysis has stopped the CLSA 200 may initiate a critical operator alert (412). If backhaul links are found to exist (if not, the operator may be informed (414) that no backhaul links are found), the CLSA 200 may assess the status (416) of the communications network (100, FIG. 1). For example, the CLSA 200 may determine (418) if the last known set of good links are available (e.g., either via display or retrieved from the link record (232, FIG. 2). The CLSA 200 may continue to maintain an accurate network status (420) by, for example, validating the set of known links (422). For example, the CLSA 200 may enter event mode at this point from an automatic circuit creation process (424). If the CLSA 200 has validated all known links (426), the CLSA may next determine (428) if it has restarted status checks for onboard radio systems 206-220, restarting status checks (430) if this has not yet been done. If automatic circuit creation has been commanded (432), the CLSA 200 may exit event mode into the automatic circuit creation process 424. If automatic circuit creation has not been commanded, but the operator has commanded a halt to event mode (434)

Figure 5A:
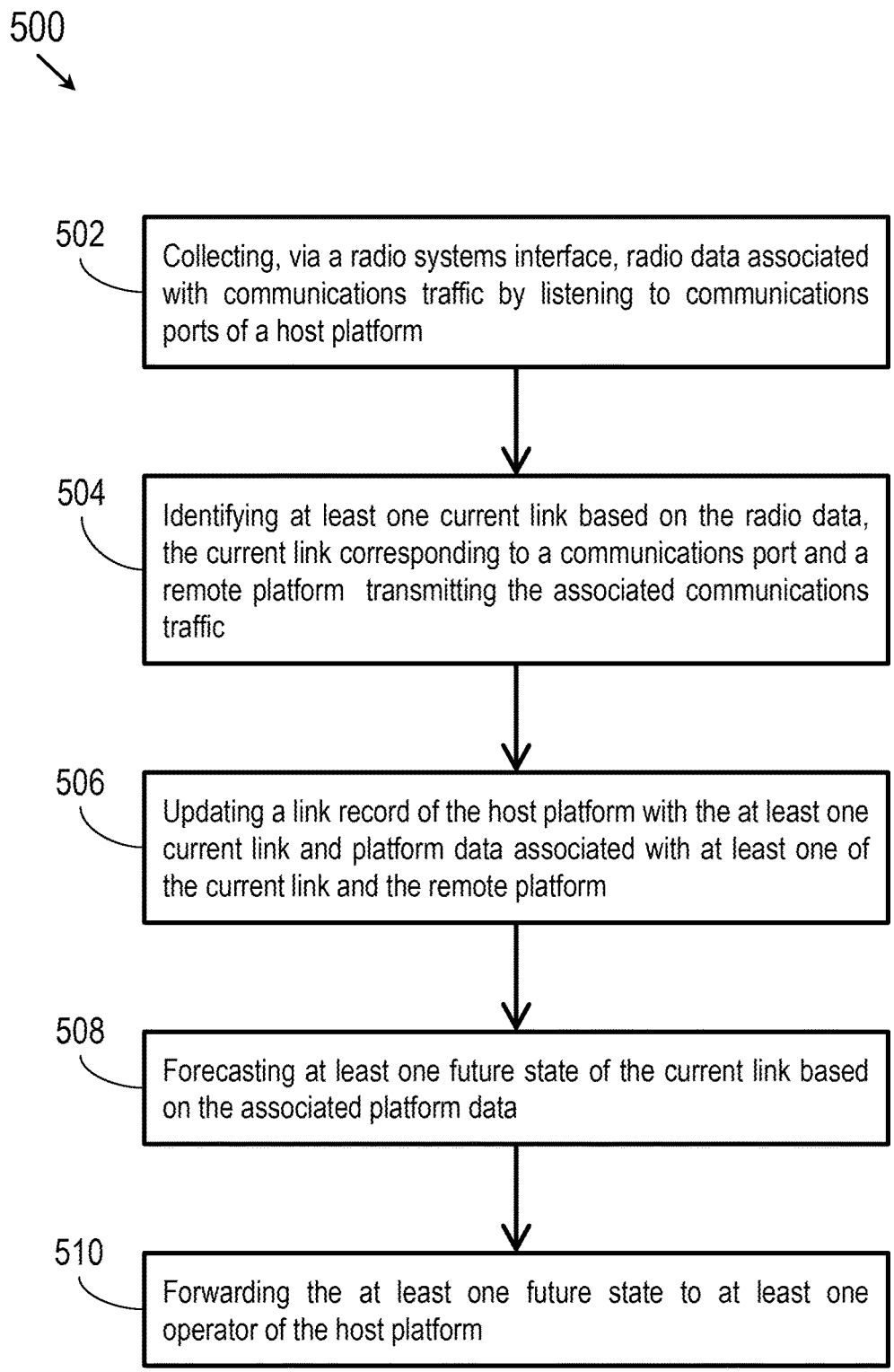
FIGS. 5A and 5B are flow diagrams illustrating a method for communications link status analysis in accordance with example embodiments of this disclosure.

Referring now to FIG. 5A, a method 500 may be implemented by embodiments of the CLSA 200 and may include the following steps. At a step 502, the radio systems interface (RSI) collects radio data associated with communications traffic by listening to communications assets of a host platform.

At a step 504, the communications link status analyzer (CLSA) identifies current links (corresponding to an inbound/outbound communications asset or port and to a remote platform from which the detected traffic originated, or to which the link extends) based on the collected radio data.

At a step 506, the CLSA updates the link record with the identified current link and any associated platform data (e.g., relevant to the current link, the communications traffic, or to the remote platform).

At a step 508, based on the associated platform data the CLSA forecasts one or more future states of the identified current link. For example, the propagation forecasts may include best path information associated with reaching a particular remote platform via a particular current link.

At a step 510, the CLSA forwards the propagation forecasts of the current links to host platform operators.

Figure 5B:
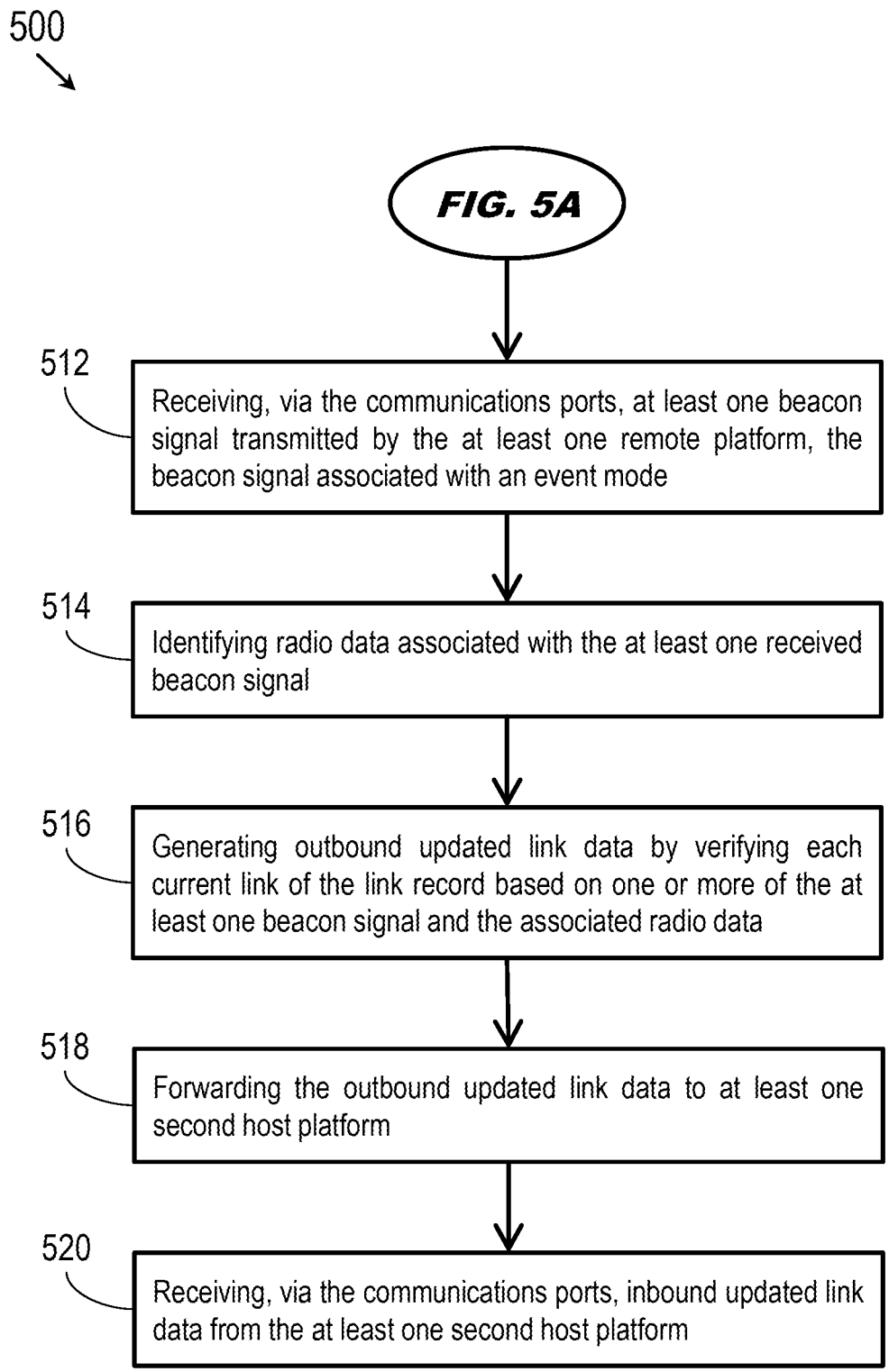

Referring also to FIG. 5B, the method 500 may further include the steps 512 through 518. At the step 512, the RSI receives beacon signals from remote platforms, the beacon signals indicative of a detected or declared event mode.

At a step 514, the CLSA identifies radio data associated with the beacon signals or remote platforms.

At a step 516, the CLSA generates outbound updated link data by verifying each current link in the link record based on the received beacon signals and associated radio data.

At the step 518, the CLSA forwards the outbound updated link data to additional host platforms (e.g., those host platforms having CLSA equipment).

The method 500 may include a further step 520. At the step 520, the CLSA receives inbound updated link data collected and verified by other host platforms (e.g., by CLSA units of the host platforms). The CLSA may incorporate this inbound updated link data in generating its own outbound updated link data.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A communications link status analyzer apparatus, comprising:
    at least one radio systems interface (RSI) communicatively coupled to one or more communications assets associated with a host platform, the RSI comprising one or more spectrum sensors configured to collect radio data associated with communications traffic received by the one or more communications assets, the host platform including a first host platform in an event mode, the one or more communications assets configured to:
    periodically transmit at least one first beacon signal; and
    receive at least one second beacon signal transmitted by at least one remote platform;
    at least one data manager operatively coupled to the RSI, the at least one data manager configured to store the collected radio data in one or more databases associated with the host platform; and
    one or more control processors operatively coupled to the at least one data manager, the one or more control processors comprising:
    a link record:
    a link analyzer configured to:
        identify at least one current link corresponding to a first communications port of the one or more communications assets and to the remote platform;
        identify platform data associated with at least one of the current link and the remote platform;
        update the link record with at least one of the current link and the platform data; and
    generate outbound updated link data by verifying each current link in the link record based on at least one element selected from a group including:
        the received second beacon signal;
        radio data associated with the second beacon signal; and
        inbound updated link data received via the communications assets from at least one second host platform, the communications assets configured to forward the outbound updated link data to the at least one second host platform;
    a propagation analyzer configured to generate at least one propagation forecast associated with a future state of the current link based on the platform data associated with the at least one of the current link and the remote platform, wherein the propagation forecast includes an event plan responsive to a command signal, wherein the event plan is configured to initiate the event mode of the host platform; and
    an operator interface configured to forward the at least one propagation forecast to an operator of the host platform.

2. The communications link status analyzer apparatus of claim 1, wherein at least one of the host platform and the remote platform is a mobile platform.

3. The communications link status analyzer apparatus of claim 1, wherein the platform data is selected from a group including:
   a signal strength associated with the communications traffic;
   a frequency associated with the communications traffic; and
   a transmission mode associated with the communications traffic.

4. The communications link status analyzer apparatus of claim 1, wherein the platform data includes timing data corresponding to at least one of the current link and the remote platform.

5. The communications link status analyzer apparatus of claim 1, wherein:
   the at least one propagation forecast includes at least one designation of the current link as an obsolete link; and
   the link analyzer is configured to remove the obsolete link from the link record.

6. The communications link status analyzer apparatus of claim 1, wherein:
   the at least one propagation forecast includes best path information associated with at least one of the current link and the remote platform.

7. A method for communications link status analysis, comprising:
   collecting, via one or more spectrum sensors, radio data associated with communications traffic by listening to communications assets of a host platform;
   identifying at least one current link based on the radio data, the current link corresponding to a communications port and a remote platform transmitting the associated communications traffic;
   updating a link record of the host platform with the at least one current link and platform data associated with at least one of the current link and the remote platform;
   forecasting at least one future state of the current link based on the platform data associated with the at least one of the current link and the remote platform;
   forwarding the at least one future state to at least one operator of the host platform,
   receiving, via the communications assets, at least one beacon signal transmitted by the remote platform, the beacon signal associated with an event mode;
   identifying radio data associated with the at least one received beacon signal;
   generating outbound updated link data by verifying each current link of the link record based on one or more of the at least one beacon signal and the radio data associated with the at least one received beacon signal; and
   forwarding the outbound updated link data to at least one second host platform.

8. The method of claim 7, wherein forecasting at least one future state of the current link based on the platform data associated with the at least one of the current link and the remote platform includes:
   generating best path data associated with the current link and the remote platform.

9. The method of claim 7, further comprising:
   receiving, via the communications assets, inbound updated link data from the at least one second host platform.

10. The method of claim 9, wherein generating outbound updated link data by verifying each current link of the link record based on one or more of the at least one beacon signal and the radio data associated with the at least one received beacon signal includes:
   generating outbound updated link data by verifying each current link of the link record based on the inbound updated link data.

* * * * *